Dec. 29, 1942.    R. R. RANEY    2,306,795
BLOCK SETTER FOR BALER
Filed Sept. 22, 1939    2 Sheets-Sheet 2
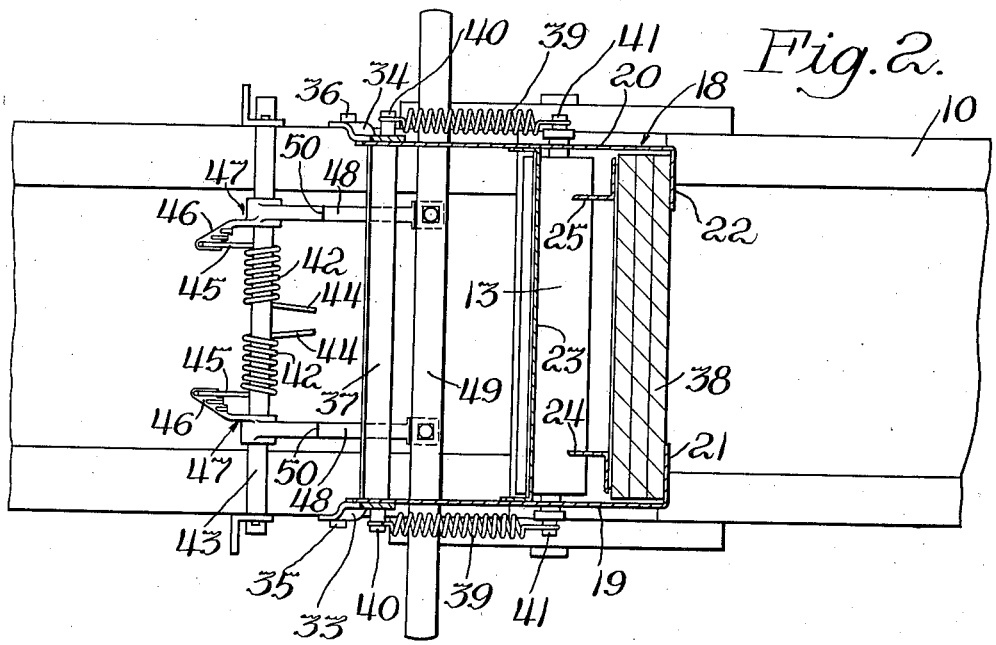
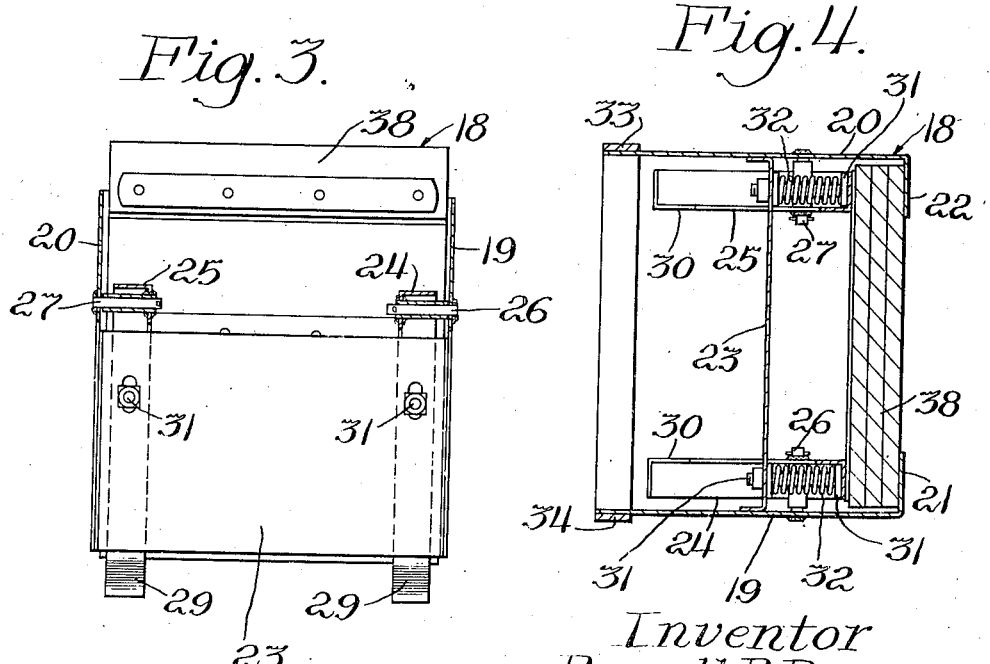
Inventor
Russell R. Raney
By Paul O. Pippel
Att'y.

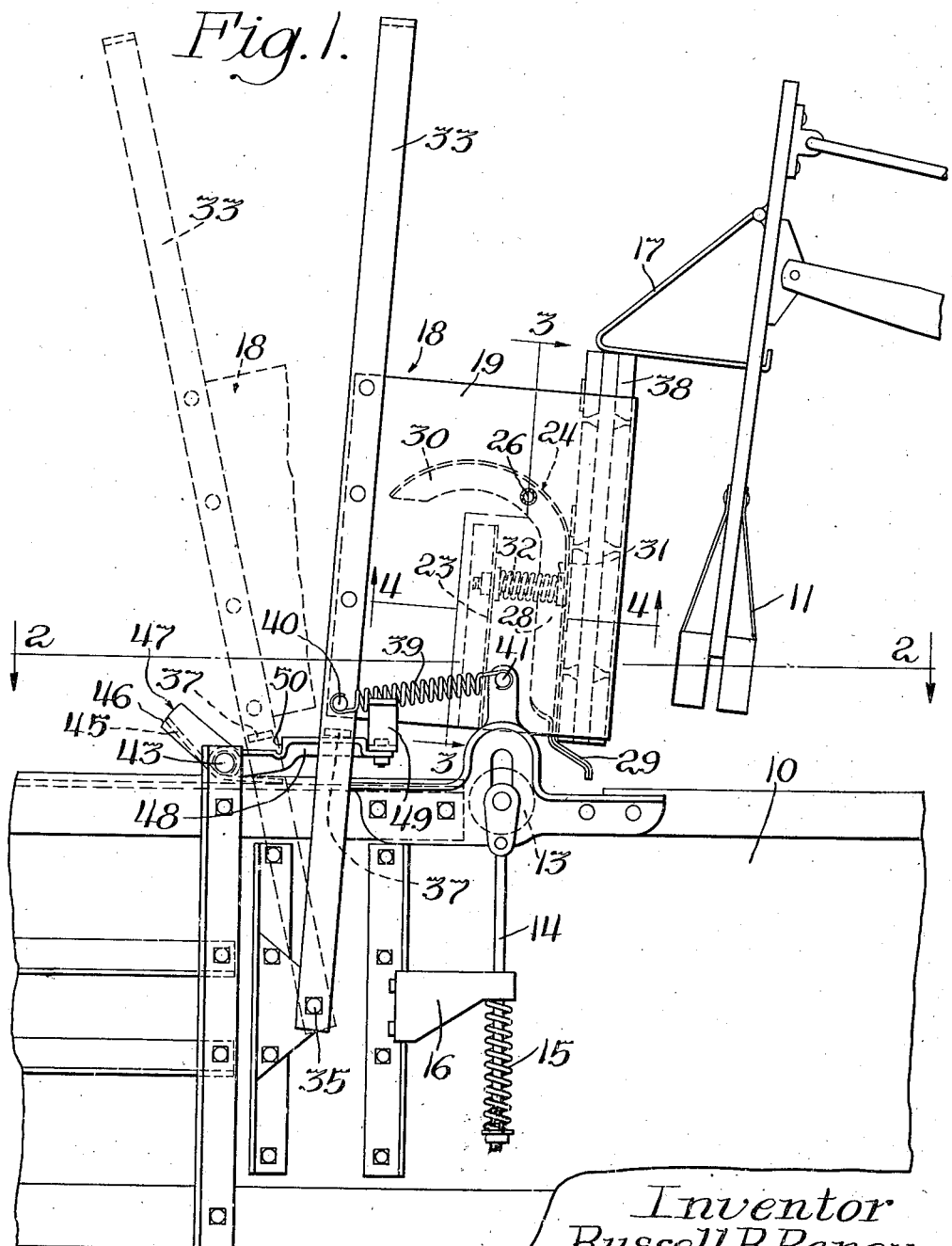

Patented Dec. 29, 1942

2,306,795

UNITED STATES PATENT OFFICE 2,306,795

BLOCK SETTER FOR BALER

Russell R. Raney, Auburn, N. Y., assignor to International Harvester Company, a corporation of New Jersey Application September 22, 1939, Serial No. 296,107

4 Claims. (Cl. 100—24)

This invention relates to a baler. More particularly it relates to a block-setter for a baler.

In balers for compressing crops such as hay, it is the usual practice to insert a block at intervals in the material being compressed so that it may be separated into bales. In some instances the block is releasably carried in a holder which at the desired time may be moved to such a position that the feeder head of the baler may force the block into the baling chamber.

An object of the present invention is to provide an improved baler.

A further object is the provision of an improved block-setter for a baler.

Another object is to provide a block holder which may be moved into a position whereby the feeder head may contact the block and force it into the baling chamber.

A further object is the formation of a block holder in such a manner that the insertion of a block therein is facilitated.

Other objects will appear from the disclosure.

According to the present invention, a block holder is pivotally mounted on a baler in such a manner that, when it is released for movement, it swings toward the feeder head so that the feeder head contacts the block and forces it into the baling chamber. The block holder is of such shape that insertion of the block therein is facilitated.

In the drawings:

Figure 1 is a side elevation of a baler including the novel block-setter;

Figure 2 is a section taken along the line 2—2 of Figure 1;

Figure 3 is a section taken along the lines 3—3 of Figure 1; and,

Figure 4 is a section taken along the line 4—4 of Figure 1.

The baler of the present invention includes a baling chamber 10, a feeder head 11, which oscillates in a vertical direction into and out of the baling chamber, and a plunger, not shown, which reciprocates horizontally in the baling chamber. There is also a tucking roller 13 yieldably carried on a rod 14, spring 15, and bracket 16. The feeder head 11 carries a triangular extension 17.

The numeral 18 designates a block holder or block setter which includes a pair of spaced parallel side walls 19 and 20 having flanges 21 and 22 at one end extending toward one another. A brace 23 extends between mid-portions of the walls. Members 24 and 25, formed of angle iron, are pivoted on pins 26 and 27 secured by welding in the walls 19 and 20. Each member comprises a straight portion 28 extending downwardly from its supporting pin in parallel spaced relation to the flanges 21 and 22, an end portion 29 extending toward and below the flanges 21 and 22, and a curved portion 30, extending from the straight portion 28 to and beyond the supporting pin and away from the flanges 19 and 20. The straight portions 28 are yieldingly urged toward the flanges 21 and 22 by pushers 31 secured to the brace 23 and surrounded by springs 32.

The walls 19 and 20 are secured to vertical supporting members, 33 and 34 connected at the top to form a U-shaped member which is in turn pivotally supported at points 35 and 36 on the baler. A member 37 ties together supporting members 33 and 34. A block 38 is held in the block setter between the flanges 21 and 22 and the portions 28 and 29 of the members 24 and 25. A spring 39 connects pins 40 and 41 mounted on the block setter 18 and the baling chamber 10, respectively.

A pair of springs 42 surrounds a pivot member 43 mounted on the top of the baling chamber 10 and has end extensions 44 contacting the baling chamber and end extensions 45 contacting arms 46 of levers 47 journaled on the pivot member 43. The levers 47 have arms 48 at the end of which is secured a treadle 49 the ends of which project beyond the baling chamber. Shoulders 50 are adapted to engage the member 37.

In operation of the baler, material to be baled is fed downwardly into the baling chamber by hand or by a conveyor, not shown, the feeder head 11 pressing the material into the chamber. The plunger, not shown, compresses the material. The block setter or block holder 18 is normally in the dotted line position of Figure 1, the block 38 being out of the path of the extension 17 on the feeder head 11. The block setter is held in this position by the arms 48 which are pressed upwardly by the springs 42 with the shoulder 50 contacting the member 37.

When it is desired to set a block, the arms 48 are moved downwardly by pressure on the treadle 49 so as to release the member 37 from the shoulders 50. The center of gravity of the block and the block holder are to the side of the pivot points 35 and 36 toward the feeder head 11. Consequently, the weight of the block and the block holder, supplemented by the spring 39, moves the block and block holder to the full line position in Figure 1, with the block in the path of the extension 17 on the feeder head.

The block is accordingly forced by the extension into the baling chamber. The block holder is then manually returned to the dotted line position. A new block is put in place in the block holder, the operation of putting the block in place being facilitated by the curved portions 30 of the members 24 and 25. Since these portions 30 are curved and extend toward the flanges 21 and 22, they facilitate the guiding of the block into position between the straight portions 28 and the flanges 21 and 22.

It will be apparent from the above description that a novel block holder has been provided. By the shape of the parts of the holder, the placing of a block in the holder is facilitated. By the mounting of the holder over its point of pivot on the baler, the holder is moved into block-setting position by its own weight upon release of a retaining means.

The intention is to limit the invention only within the scope of the appended claims.

What is claimed is:

1. The combination with a baler including a feeder head, of a block setter comprising a supporting member pivoted on the baler and extending upwardly therefrom, a block case secured to the support above the pivot point and comprising a pair of spaced side members having flanges at one end extending toward one another, a pair of elements pivoted on the side walls, each element comprising a straight portion near one end to one side of the pivot parallel to a flange of the side members, a portion at the end extending toward the side members for holding a block, and a curved portion adjoining the straight portion and extending on the opposite side of the pivot from the straight portion for facilitating the insertion of a block between the straight portion and the flange of a side member, yieldable means urging the straight portion toward the flange, releasable means holding the support to one side of the pivot point with the block case to the other side whereby, upon release of the releasable means, the block case moves by its own weight further to one side of the pivot point so as to bring the block in position to be set by contact with the feeder head.

2. The combination with a baler including a feeder head, of a block setter comprising a block-holder formed of a pair of spaced side members having flanges at one end extending toward one another, a pair of elements pivoted to the spaced members, each comprising a portion adjacent the flange of a side member for releasably holding a block therebetween and a curved portion adjoining the said portion and extending away from the flange for facilitating the insertion of a block between the said first portion and the flange, means pivotally supporting the block-holder on the baler at a point below the block-holder and on the opposite side of the center of gravity of the block-holder when carrying a block from the feeder head, and means retaining the block-holder against movement with respect to the baler whereby, upon release of the retaining means, the block-holder swings to move the block into position to be set by contact with the feeder head.

3. The combination with a baler including a feeder head, of block-holding means pivoted on the baler and comprising a pair of side members having flanges at one end extending toward one another, a pair of elements pivoted on the side members, each element comprising a portion positioned in spaced parallel relation with the flange of a side member and a curved portion extending away from the flange for facilitating insertion of a block between the flange and the first portion, means for retaining the block-holding means against movement with respect to the baler whereby, upon release of the retaining means, the block-holding means swings by its own weight so as to bring the block in position to be set by contact with the feeder head.

4. The combination with a baler, of a block-holder comprising a pair of spaced parallel side walls having flanges at one end extending toward one another, a pair of members, one pivoted on one wall, the other pivoted on the other wall on the same axis as the first one, each member comprising a straight portion extending downwardly from its pivot point in spaced parallel relation with the flange of a member, a portion at the end extending toward the flange, and a curved portion extending from the straight portion through the pivot point and beyond away from the flange for facilitating insertion of a block between the straight portion and the flange, and means yieldingly urging the straight portion of each member toward a flange.

RUSSELL R. RANEY.